United States Patent
Li et al.

(10) Patent No.: US 11,651,031 B2
(45) Date of Patent: May 16, 2023

(54) ABNORMAL DATA DETECTION

(71) Applicant: INTERNATIONAL BUSINESS MACHINES CORPORATION, Armonk, NY (US)

(72) Inventors: Shuo Li, Beijing (CN); Sheng Yan Sun, BeiJing (CN); Xiaobo Wang, Beijing (CN); Meng Wan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 16/988,776

(22) Filed: Aug. 10, 2020

(65) Prior Publication Data
US 2022/0043860 A1 Feb. 10, 2022

(51) Int. Cl.
*G06F 16/901* (2019.01)

(52) U.S. Cl.
CPC ................ *G06F 16/9024* (2019.01)

(58) Field of Classification Search
CPC ... G06F 16/9024; G06F 17/18; G06K 9/6223; G06K 9/6267
USPC ........................................................ 707/798
See application file for complete search history.

(56) References Cited

U.S. PATENT DOCUMENTS

| | | | |
|---|---|---|---|
| 6,950,786 B1 | 9/2005 | Sonneland | |
| 7,739,284 B2 | 6/2010 | Aggarwal | |
| 8,306,931 B1* | 11/2012 | Bowman | G06N 3/0454 706/26 |
| 8,631,044 B2* | 1/2014 | Jebara | G06Q 10/04 709/201 |
| 9,292,493 B2 | 3/2016 | Chandramouli | |
| 2006/0263833 A1* | 11/2006 | Loken | G06K 9/6254 702/19 |
| 2017/0019308 A1 | 1/2017 | Rapoport | |
| 2017/0124478 A1* | 5/2017 | Baradaran | H04L 63/1425 |
| 2018/0119138 A1* | 5/2018 | Bauer | C12N 15/1075 |
| 2018/0338715 A1* | 11/2018 | Howard | A61B 5/6887 |
| 2019/0079821 A1* | 3/2019 | Jeong | G06N 3/0445 |
| 2019/0236114 A1* | 8/2019 | Li | G06K 9/6284 |

(Continued)

OTHER PUBLICATIONS

Gupta et al., "Outlier Detection for Temporal Data: A Survey", IEEE Transactions on Knowledge and Data Engineering, vol. 25, No. 1, Jan. 2014, pp. 1-20.

(Continued)

*Primary Examiner* — James Trujillo
*Assistant Examiner* — Antonio J Caiado
(74) *Attorney, Agent, or Firm* — L. Jeffrey Kelly (57) ABSTRACT

A method, system, and computer program product for abnormal data detection. According to the method, a plurality of data points collected at different time points are classified into a plurality of groups. A plurality of groups of potential abnormal data points are determined from the plurality of groups. Correlations between a first group of the plurality of groups of potential abnormal data points with other groups of potential abnormal data points are determined. In response to the first group of the plurality of groups of potential abnormal data points being uncorrelated to a majority of the other groups of potential abnormal data points based on the correlations, data points in the first group are identified as abnormal data points.

20 Claims, 7 Drawing Sheets

(56) References Cited

U.S. PATENT DOCUMENTS

2020/0201701 A1* 6/2020 Wang ................ G06F 11/0775
2021/0117868 A1* 4/2021 Sriharsha ............... G06N 20/20

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

ABNORMAL DATA DETECTION

BACKGROUND

The present disclosure relates to data processing, and more specifically, to a method, system, and computer program product for abnormal data detection.

An automatic health check based on statistic data becomes more and more important for a database. A database may have innumerable statistics and most of them may have no tag. In this event, it is difficult to detect which statistics are abnormal and may be the root cause of a failure of the database.

SUMMARY

According to one embodiment of the present disclosure, there is provided a computer-implemented method. According to the method, one or more processors classify a plurality of data points collected at different time points into a plurality of groups, wherein each of the plurality of groups comprises either potential abnormal data points or potential normal data points. One or more processors determine a plurality of groups of potential abnormal data points from the plurality of groups. One or more processors determine correlations between a first group of the plurality of groups of potential abnormal data points with other groups of potential abnormal data points. In addition, one or more processors identify, in response to the first group of the plurality of groups of potential abnormal data points being uncorrelated to a majority of the other groups of potential abnormal data points based on the correlations, data points in the first group as abnormal data points.

According to another embodiment of the present disclosure, there is provided a system. The system comprises a processing unit and a memory coupled to the processing unit. The memory stores instructions that, when executed by the processing unit, perform actions comprising: classifying a plurality of data points collected at different time points into a plurality of groups, wherein each of the plurality of groups comprises either potential abnormal data points or potential normal data points; determining a plurality of groups of potential abnormal data points from the plurality of groups; determining correlations between a first group of the plurality of groups of potential abnormal data points with other groups of potential abnormal data points; and in response to the first group of the plurality of groups of potential abnormal data points being uncorrelated to a majority of the other groups of potential abnormal data points based on the correlations, identifying data points in the first group as abnormal data points.

According to yet another embodiment of the present disclosure, there is provided a computer program product. The computer program product is tangibly stored on a non-transient machine-readable medium and comprises machine-executable instructions. The machine-executable instructions, when executed on a device, cause the device to perform actions comprising: classifying a plurality of data points collected at different time points into a plurality of groups, wherein each of the plurality of groups comprises either potential abnormal data points or potential normal data points; determining a plurality of groups of potential abnormal data points from the plurality of groups; determining correlations between a first group of the plurality of groups of potential abnormal data points with other groups of potential abnormal data points; and in response to the first group of the plurality of groups of potential abnormal data points being uncorrelated to a majority of the other groups of potential abnormal data points based on the correlations, identifying data points in the first group as abnormal data points.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
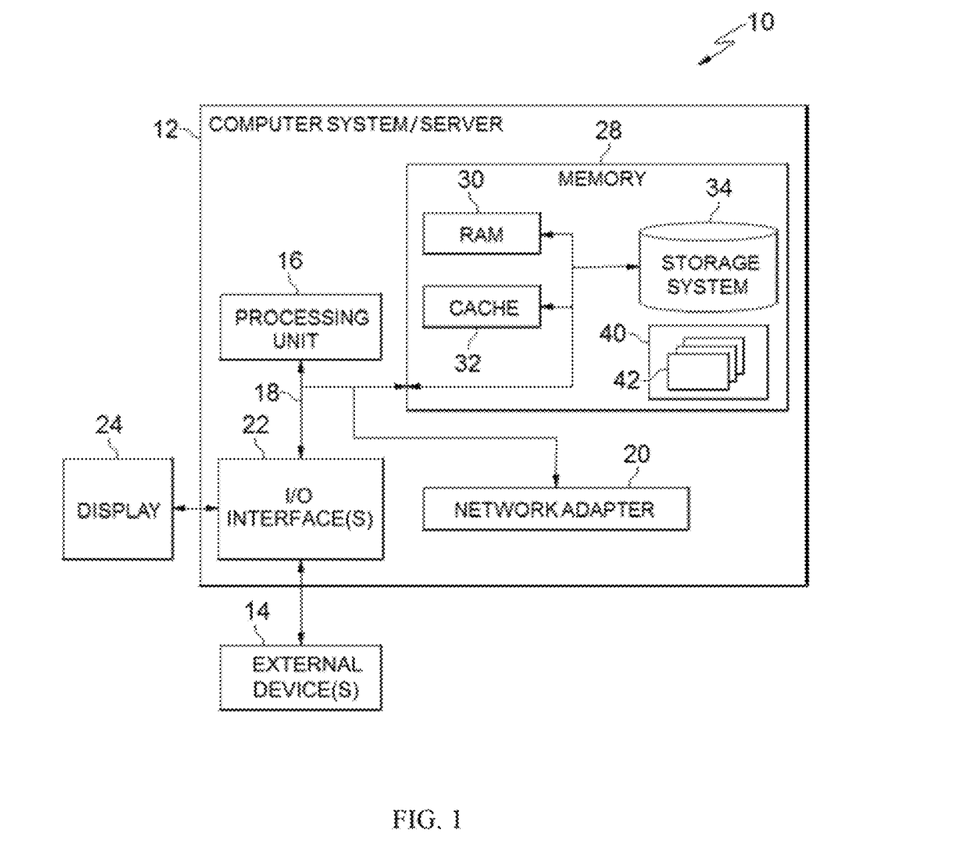
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
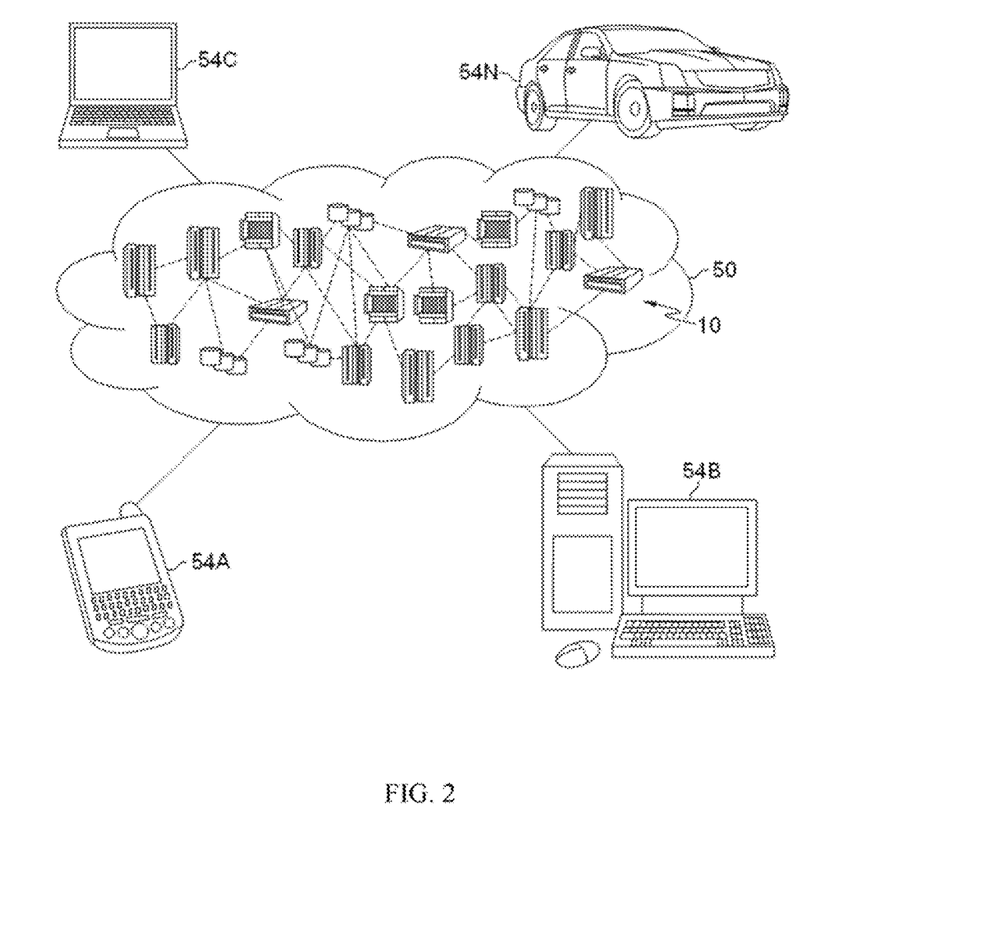
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
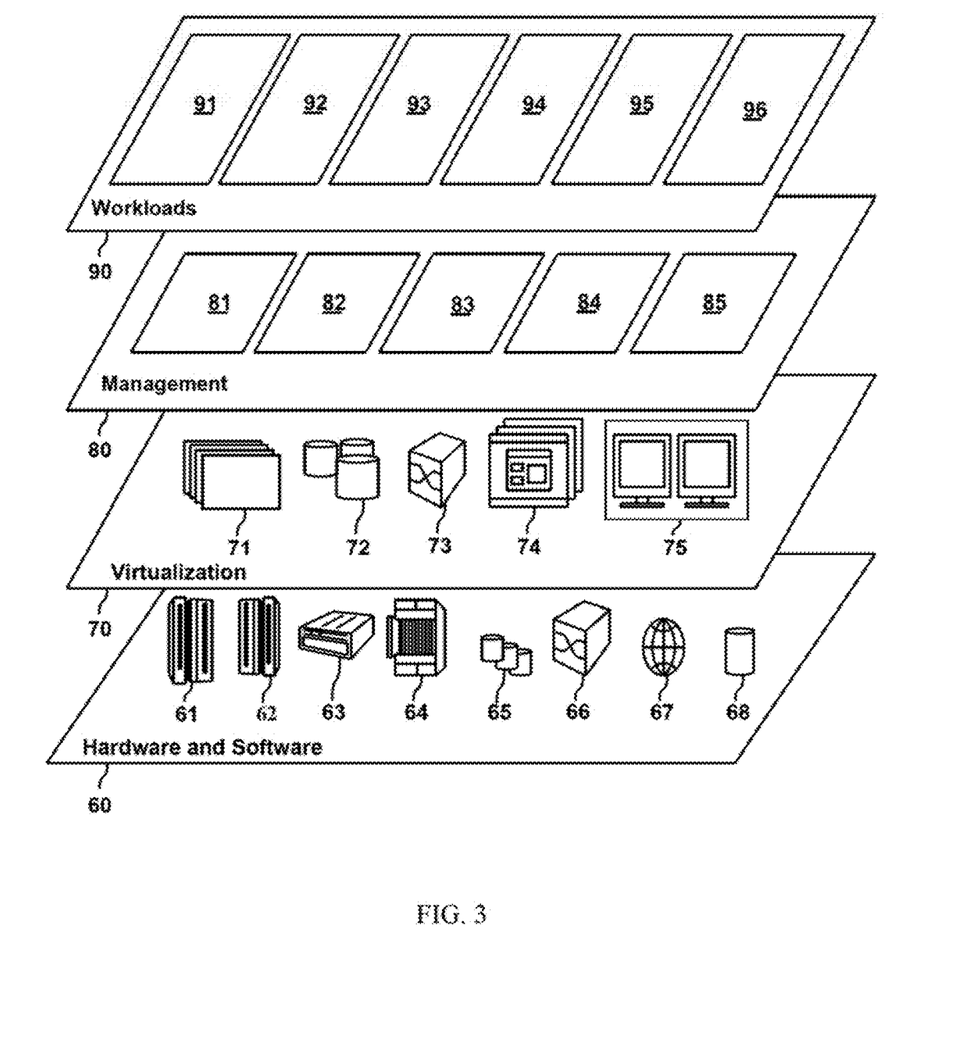
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and abnormal data detection 96. Hereinafter, reference will be made to FIGS. 4-7 to describe details of the abnormal data detection 96.

As described above, an automatic health check based on statistic data becomes more and more important for a database. A database may have innumerable statistics and most of them may have no tag. In this event, it is difficult to detect which statistics are abnormal and may be the root cause of a failure of the database.

Some conventional solutions use the smoothing technology to detect abnormal data points. For example, these solutions determine a normal data range based on an average value of a plurality of data points and identify those data points falling outside the normal data range as abnormal data points. However, the statistics of the database may change dramatically over time. For example, the statistics during peak periods may be significantly different from the statistics during normal periods (i.e., off-peak periods). In this case, the average-value-based normal data range may ignore the difference between peak periods and normal periods. Therefore, it might be difficult to detect abnormal data points accurately. For example, during peak periods, data points falling outside the normal data range may not be necessarily abnormal, while data points falling within the normal data range may not be necessarily normal.

In order to at least partially solve the above and other potential problems, embodiments of the present disclosure provide a solution for abnormal data detection. This solution classifies data points into potential normal data points and potential abnormal data points. For example, the potential normal data points are collected within normal periods, while the potential abnormal data points are collected within peak periods. This solution determines a plurality of groups of potential abnormal data points based on the classification, then analyzes correlation coefficients among the plurality of groups of potential abnormal data points and identifies abnormal data points from the plurality of groups of potential abnormal data points based on the correlation coefficients. For the potential normal data points collected within the normal periods, this solution determines, based on an average value and a standard deviation of the potential normal data points, a normal data range. Then, this solution identifies those potential normal data points falling outside the normal data range as abnormal data points. In this way, embodiments of the present disclosure can detect abnormal data points accurately without being affected by different data characters between peak periods and normal periods.

Figure 4:
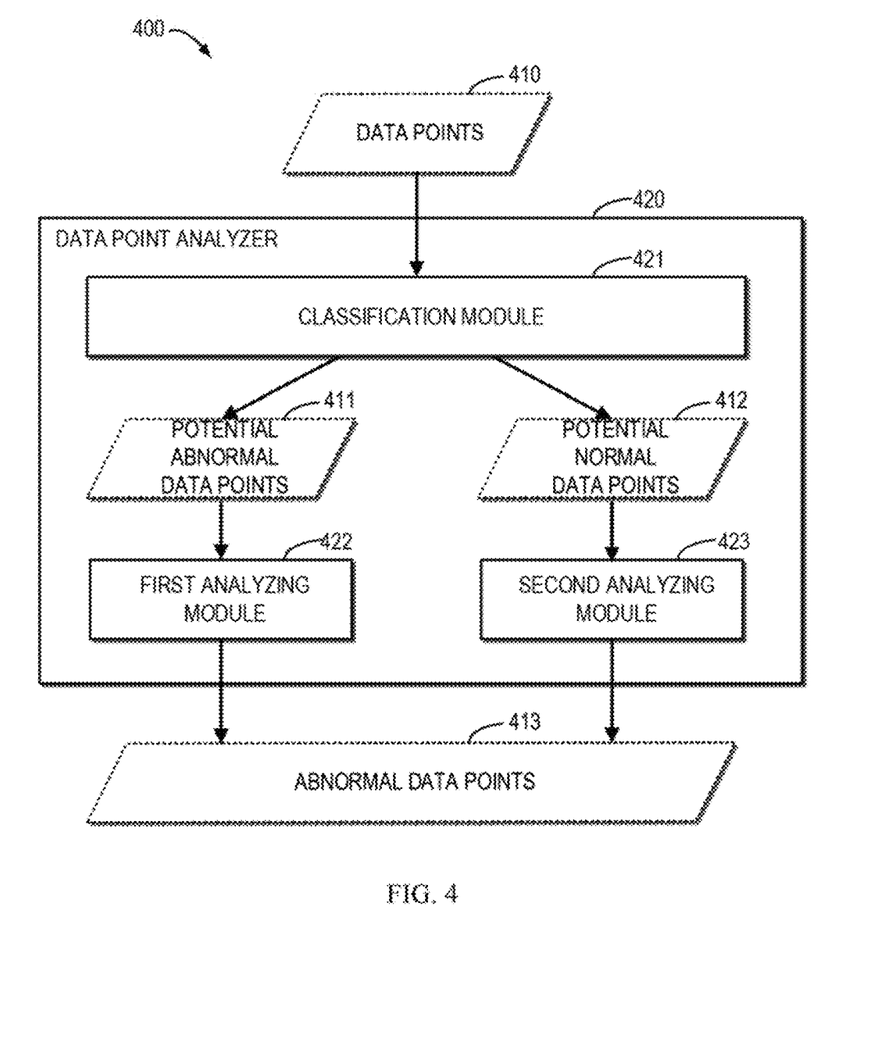
FIG. 4 depicts a system according to embodiments of the present disclosure.

With reference now to FIG. 4, a system 400 in which embodiments of the present disclosure can be implemented is shown. It is to be understood that the structure and functionality of the system 400 are described only for the purpose of illustration without suggesting any limitations as to the scope of the present disclosure. The embodiments of the present disclosure can be embodied with a different structure and/or functionality. For example, at least part or all of the system 400 may be implemented by computer system/server 12 of FIG. 1.

The system 400 may include a data point analyzer 420. For example, the data point analyzer 420 may be implemented by computer system/server 12 of FIG. 1. As shown in FIG. 4, the data point analyzer 420 may include a classification module 421, a first analyzing module 422, and a second analyzing module 423.

The data point analyzer 420 may receive a plurality of data points 410. For example, the plurality of data points 410 may indicate values of a performance indicator of a database collected at different time points. Examples of the performance indicator may include but not limited to CPU usage, the number of I/O requests, a count of latches and so on.

The classification module 421 may classify the plurality of data points 410 into potential abnormal data points and potential normal data points. The potential abnormal data points may be data points collected within peak periods, whose values may exceed a predetermined threshold. The potential normal data points may be data points collected within normal periods, whose values may be below the predetermined threshold. The classification module 421 may then divide the plurality of data points 410 into a plurality of groups of data points corresponding to different time windows, where each of the plurality of groups of data points includes either potential abnormal data points or potential normal data points collected within a respective time window. The potential abnormal data points may include both abnormal data points and normal data points, while the potential normal data points may include both normal data points and abnormal data points. In this way, as shown in FIG. 4, the classification module 421 may output a plurality of groups of potential abnormal data points 411 to the first analyzing module 422 and output a plurality of groups of normal data points 412 to the second analyzing module 423.

The first analyzing module 422 may analyze the plurality of groups of potential abnormal data points 411 and identify abnormal data points from the plurality of groups of potential abnormal data points 411. For example, the first analyzing module 422 may determine correlations among the plurality of groups of potential abnormal data points 411. If a group of potential abnormal data points are uncorrelated to a majority of the plurality of groups of potential abnormal data points 411 based on the correlations, the first analyzing module 422 may identify the group of potential abnormal data points as abnormal data points. For example, if a group of potential abnormal data points are uncorrelated to more than 50% of the plurality of groups of potential abnormal data points 411 based on the correlations, the first analyzing module 422 may identify the group of potential abnormal data points as abnormal data points.

The second analyzing module 423 may analyze the plurality of groups of potential normal data points 412 and identify abnormal data points from the plurality of groups of potential normal data points 412. For example, for each group of potential normal data points, the second analyzing module 423 may determine, based on an average value of the group of potential normal data points and a standard deviation of the group of potential normal data points, a normal data range. If a data point in the group of potential normal data points falls outside the normal data range, the second analyzing module 423 may identify the data point as an abnormal data point.

In this way, as shown in FIG. 4, the data point analyzer 420 may identify abnormal data points 413 from the plurality of data points 410.

Figure 5:
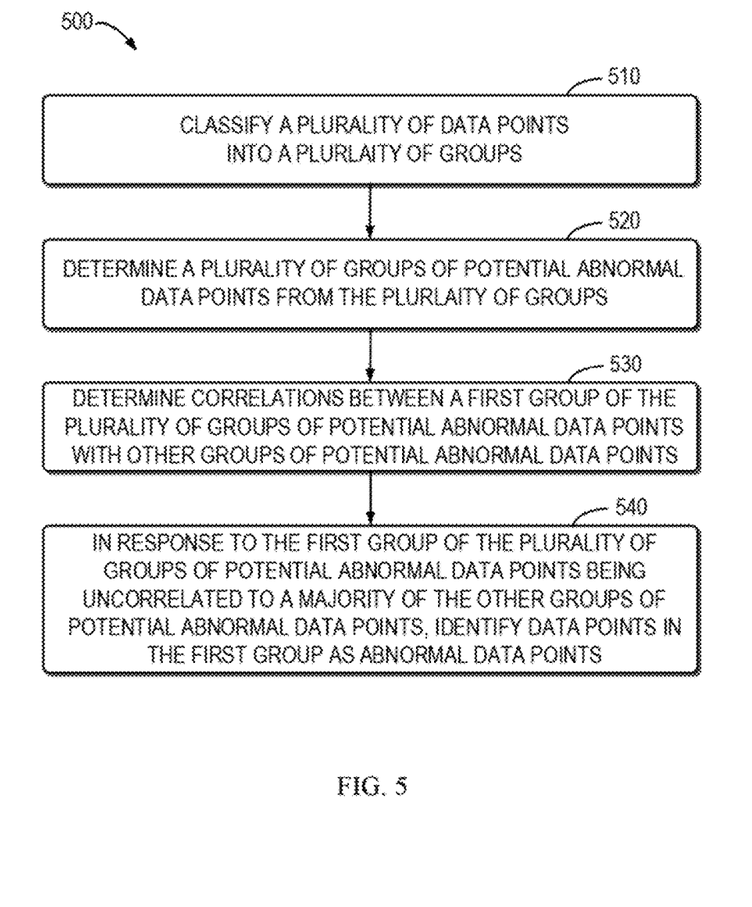
FIG. 5 depicts a flowchart of an example method for abnormal data detection according to embodiments of the present disclosure.

FIG. 5 depicts a flowchart of an example method 500 for abnormal data detection according to embodiments of the present disclosure. The method 500 may be implemented at the data point analyzer 420 as shown in FIG. 4. For example, at least part or all of the data point analyzer 420 may be implemented by computer system/server 12 of FIG. 1. It is to be understood that the method 500 may also comprise additional blocks (not shown) and/or may omit the illustrated blocks. The scope of the present disclosure described herein is not limited in this aspect.

At block 510, the data point analyzer 420 (for example, by means of the classification module 421) classifies a plurality of data points 410 collected at different time points into a plurality of groups based on time windows to collect those data points. Each of the plurality of groups comprises either potential normal data points or potential abnormal data points.

In some embodiments, the plurality of data points 410 may indicate values of a performance indicator of a database collected at different time points. Examples of the performance indicator may include but not limited to CPU usage, the number of I/O requests, a count of latches or so on.

In some embodiments, the data point analyzer 420 (for example, by means of the classification module 421) may classify the plurality of data points 410 into potential abnormal data points and potential normal data points. The potential abnormal data points may be data points collected within peak periods, whose values may exceed a predetermined threshold. The potential normal data points may be data points collected within normal periods, whose values may be below the predetermined threshold. Therefore, the data point analyzer 420 (for example, by means of the classification module 421) may divide the plurality of data points 410 into a plurality of groups corresponding to different time windows, where each of the plurality of groups includes either potential abnormal data points or potential normal data points collected within a respective time window.

In some embodiments, the data point analyzer 420 (for example, by means of the classification module 421) may classify the plurality of data points 410 into the plurality of groups by using a clustering algorithm, where each of the plurality of groups comprises either potential abnormal data points or potential normal data points collected within a respective time window. Examples of the clustering algorithm may include but not limited to the k-means clustering algorithm which is known in the art.

Figure 6:
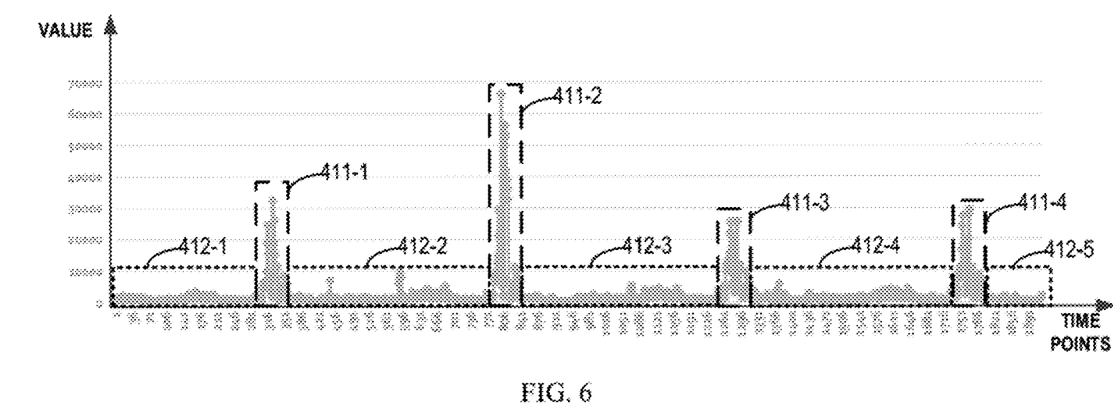
FIG. 6 depicts a diagram of data classification according to embodiments of the present disclosure.

FIG. 6 depicts a diagram of data classification according to embodiments of the present disclosure. In FIG. 6, for example, each data point represents a count of latches observed at a respective time point. For the purpose of illustration, the time points are serialized into integers. As shown in FIG. 6, the data point analyzer 420 (for example, by means of the classification module 421) may classify the plurality of data points 410 into a plurality of groups corresponding to different time windows. For example, the plurality of groups include a plurality of groups of potential abnormal data points 411-1~411-4 (collectively referred to as "groups 411" or individually referred to as "group 411") and a plurality of groups of potential normal data points 412-1~412-5 (collectively referred to as "groups 412" or individually referred to as "group 412"). Table 1 illustrates time windows corresponding to the groups 411-1~411-4.

TABLE 1

Time Windows corresponding to different groups

| Group | Start Time Point | End Time Point |
|---|---|---|
| Group 411-1 | 313 | 333 |
| Group 411-2 | 793 | 813 |
| Group 411-3 | 1273 | 1293 |
| Group 411-4 | 1753 | 1771 |

With reference to FIG. 5, at block 520, the data point analyzer 420 (for example, by means of the first analyzing module 422) determines a plurality of groups of potential abnormal data points from the plurality of groups.

In some embodiments, the data point analyzer 420 (for example, by means of the first analyzing module 422) may determine each of the plurality of groups of potential abnormal data points based on a corresponding one of the plurality of groups comprising potential abnormal data points. For example, as shown in FIG. 6, the data point analyzer 420 (for example, by means of the first analyzing module 422) may determine the groups of potential abnormal data points 411-1~411-4 from the plurality of groups.

In some embodiments, the data point analyzer 420 (for example, by means of the first analyzing module 422) may further determine whether each of the plurality of groups of potential abnormal data points is subject to a predetermined distribution. For example, the predetermined distribution may be a Gaussian distribution. In some embodiments, if a group of the plurality of groups of potential abnormal data points is not subject to the predetermined distribution, the data point analyzer 420 may remove the group from the plurality of groups of potential abnormal data points.

In some embodiments, in order to determine whether a group of potential abnormal data points is subject to a Gaussian distribution, the data point analyzer 420 (for example, by means of the first analyzing module 422) may perform a Kolmogorov-Smirnov (K-S) test in the art on the group of potential abnormal data points. Alternatively, in some embodiments, the data point analyzer 420 (for example, by means of the first analyzing module 422) may generate a Q-Q graph based on a group of potential abnormal data points and determine, based on the Q-Q graph, whether the group of potential abnormal data points is subject to a Gaussian distribution. It is to be understood that, in addition to the K-S test and the Q-Q graph which are known in the art, the data point analyzer 420 (for example, by means of the first analyzing module 422) may utilize any other approaches currently known or to be developed in the future to determine whether a group of data points is subject to the Gaussian distribution, and the scope of the present disclosure is not limited in this aspect.

As such, the data point analyzer 420 (for example, by means of the first analyzing module 422) may determine a plurality of groups of potential abnormal data points collected within different time windows, where each of the plurality of groups of potential abnormal data points is subject to the predetermined distribution (such as, a Gaussian distribution).

At block 530, the data point analyzer 420 (for example, by means of the first analyzing module 422) determines correlations between a first group of the plurality of groups of potential abnormal data points with other groups of potential abnormal data points.

In some embodiments, in order to determine the correlations, the data point analyzer 420 (for example, by means of the first analyzing module 422) may perform an Analysis of Variance (ANOVA) on the plurality of groups of potential abnormal data points. For example, with reference to the example as shown in FIG. 6, it is assumed that each of the groups 411-1~411-4 is subject to a Gaussian distribution. Thus, the data point analyzer 420 (for example, by means of the first analyzing module 422) may determine correlation coefficients among the groups 411-1~411-4 by performing an ANOVA. Table 2 illustrates the correlation coefficients among the groups 411-1~411-4.

TABLE 2

Correlation coefficients among different groups

|  | Group 411-1 | Group 411-2 | Group 411-3 | Group 411-4 |
|---|---|---|---|---|
| Group 411-1 | — | 0.008 | 0.557 | 0.588 |
| Group 411-2 | 0.008 | — | 0.035 | 0.031 |
| Group 411-3 | 0.557 | 0.035 | — | 0.963 |
| Group 411-4 | 0.588 | 0.031 | 0.963 | — |

In some embodiments, if a correlation coefficient between two groups of potential abnormal data points is below a first threshold (for example, 0.05), it means that the two groups of potential abnormal data points are uncorrelated. In some embodiments, if a correlation coefficient between two groups of potential abnormal data points exceeds a second threshold (for example, 0.5), it means that the two groups of potential abnormal data points are correlated. As such, the correlations among the plurality of groups of potential abnormal data points can be determined according to correlation coefficients and predetermined thresholds.

With reference to FIG. 5, at block 540, in response to the first group of the plurality of groups of potential abnormal data points being uncorrelated to a majority of the other groups of potential abnormal data points based on the correlations, the data point analyzer 420 (for example, by means of the first analyzing module 422) identifies data points in the first group as abnormal data points.

As shown in Table 1, the correlation coefficients between the group 411-2 and other groups 411-1, 411-3, 411-4 are all below the first threshold (that is, 0.05). That is, the group 411-2 is uncorrelated to the groups 411-1, 411-3 and 411-4. In this event, the data point analyzer 420 (for example, by means of the first analyzing module 422) may identify data points comprised in the group 411-2 as abnormal data points.

Figure 7:
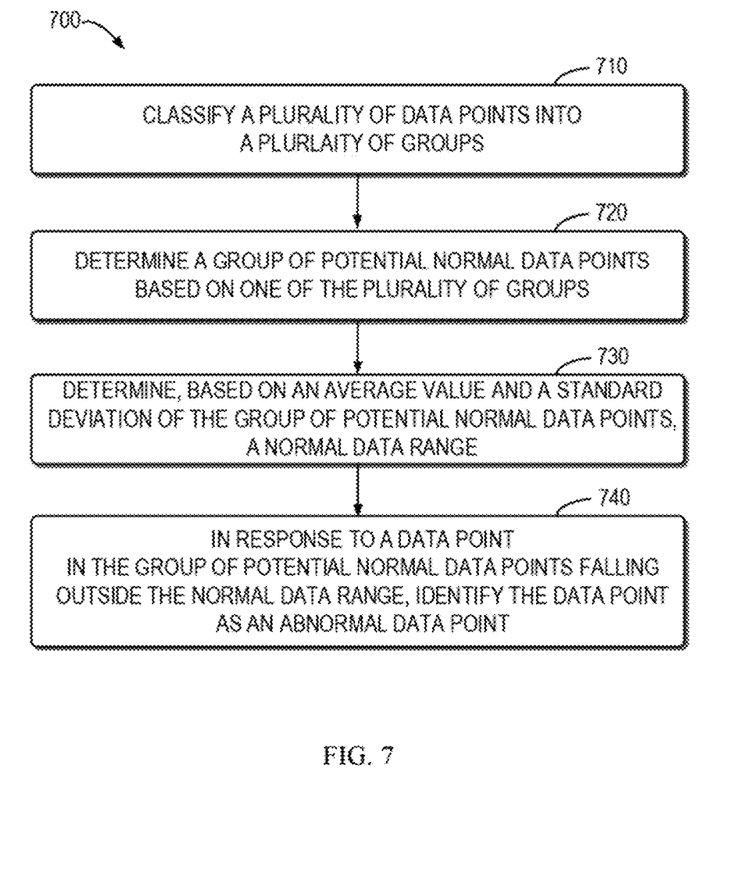
FIG. 7 depicts a flowchart of an example method for abnormal data detection according to embodiments of the present disclosure.

FIG. 7 depicts a flowchart of an example method 700 for abnormal data detection according to embodiments of the present disclosure. The method 700 may be implemented at the data point analyzer 420 as shown in FIG. 4. For example, the method 700 may be performed sequentially or in parallel with the method 500 by the data point analyzer 420. It is to be understood that the method 700 may also comprise additional blocks (not shown) and/or may omit the illustrated blocks. The scope of the present disclosure described herein is not limited in this aspect.

At block 710, the data point analyzer 420 (for example, by means of the classification module 421) classifies a plurality of data points 410 collected at different time points into a plurality of groups, where each of the plurality of groups comprises either potential normal data points or potential abnormal data points. The block 710 can be implemented in the same way as the block 510 shown in FIG. 5, which will not be further described in detail here.

At block 720, the data point analyzer 420 (for example, by means of the second analyzing module 423) determines a group of potential normal data points based on one of the plurality of groups comprising potential normal data points. For example, with reference to the example as shown in FIG. 6, the data point analyzer 420 (for example, by means of the second analyzing module 423) may determine a plurality of groups of potential normal data points 412-1~412-5 from the plurality of groups.

At block 730, the data point analyzer 420 (for example, by means of the second analyzing module 423) determines, based on an average value of the group of potential normal data points and a standard deviation of the group of potential normal data points, a normal data range. For example, with reference to the example as shown in FIG. 6, for each of the groups 412-1~412-5, the data point analyzer 420 (for example, by means of the second analyzing module 423) may determine, based on an average value and a standard deviation of the respective group, a normal data range. For example, the normal data range may be [mean_value−3σ, mean_value+3σ], where mean_value represents the average value of the group of potential normal data points and σ represents the standard deviation of the group of potential normal data points. It is to be understood that the standard deviation of the group of potential normal data points can be determined in a conventional way which is known in the art.

At block 740, in response to a data point in the group of potential normal data points falling outside the normal data range, the data point analyzer 420 (for example, by means of the second analyzing module 423) identifies the data point as an abnormal data point.

It can be seen that embodiments of the present disclosure provide a solution for abnormal data detection. This solution can classify data points into potential normal data points and potential abnormal data points, then determine a plurality of groups of potential abnormal data points based on the classification. The solution can further analyze correlation coefficients among the plurality of groups of potential abnormal data points, then identify abnormal data points from the plurality of groups of potential abnormal data points based on the correlation coefficients. For potential normal data points, this solution can determine, based on an average value and a standard deviation of the potential normal data points, a normal data range. Then, this solution can identify data points falling outside the normal data range as abnormal data points. In this way, embodiments of the present disclosure can detect abnormal data points accurately without being affected by different data characters between peak periods and normal periods.

It should be noted that the processing of abnormal data detection according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
 classifying, by one or more processors, a plurality of data points collected at different time points into a plurality of groups,
  wherein each of the plurality of groups comprises either potential abnormal data points or potential normal data points,
  wherein each data point of the plurality of data points comprises a value of a performance indicator of a database collected at corresponding time point of a set of time points,
  wherein the value of a performance indicator is a count of latches observed;
 determining, by the one or more processors, a plurality of groups of potential normal data points from the plurality of groups,
  wherein each group of the plurality of groups of potential normal data points are collected within a corresponding range of time points,
  wherein each data point of the plurality of groups of potential normal data points comprises a value of a performance indicator below a first threshold of 30,000 latches within the corresponding range time points,
  wherein the corresponding range of time points comprises a normal usage time period of database usage;
 determining, by the one or more processors, an average value and a standard deviation of the potential normal data points of the plurality of groups of potential normal data points from the plurality of groups;
 determining, by the one or more processors, a plurality of groups of potential abnormal data points from the plurality of groups,
  wherein each group of the plurality of groups of potential abnormal data points are collected within a corresponding range of time points,
  wherein each data point of the plurality of groups of potential abnormal data points comprises a value of the performance indicator above the first threshold within the corresponding range of time points, wherein the corresponding range of time points comprises a peak usage time period of database usage;

determining, by the one or more processors, correlations between a first group of the plurality of groups of potential abnormal data points with other groups of potential abnormal data points based on the average value and the standard deviation of the potential normal data points of the plurality of groups of potential normal data points from the plurality of groups, wherein a first subset of data points are uncorrelated to greater than 50 percent of the plurality of groups of potential data points;

in response to the first group of the plurality of groups of potential abnormal data points being uncorrelated to a majority of the other groups of potential abnormal data points based on the correlations, identifying, by the one or more processors, a first subset of data points in the first group as abnormal data points; and in response to identifying the first subset of data points in the first group as abnormal datapoints, identifying, by the one or more processors, which statistics are abnormal and are a root cause of a failure of the database.

2. The method of claim 1, wherein classifying the plurality of data points into the plurality of groups comprises:

classifying, by the one or more processors, the plurality of data points into the plurality of groups by using a k-means clustering algorithm, wherein either potential abnormal data points or potential normal data points comprised in each of the plurality of groups are collected within a respective time window.

3. The method of claim 1, wherein determining the plurality of groups of potential abnormal data points from the plurality of groups comprises:

determining, by the one or more processors, each of the plurality of groups of potential abnormal data points based on a corresponding one of the plurality of groups comprising the potential abnormal data points;

determining, by the one or more processors, whether each of the plurality of groups of potential abnormal data points is subject to a predetermined distribution; and in response to a second group of the plurality of groups of potential abnormal data points being not subject to the predetermined distribution, removing, by the one or more processors, the second group from the plurality of groups of potential abnormal data points.

4. The method of claim 3, wherein the predetermined distribution is a Gaussian distribution.

5. The method of claim 3, wherein determining whether each of the plurality of groups of potential abnormal data points is subject to the predetermined distribution comprises:

performing, by the one or more processors, a Kolmogorov-Smirnov test on each of the plurality of groups of potential abnormal data points.

6. The method of claim 3, wherein determining whether each of the plurality of groups of potential abnormal data points is subject to the predetermined distribution comprises:

generating, by the one or more processors, a Q-Q graph based on each of the plurality of groups of potential abnormal data points; and determining, by the one or more processors, whether each of the plurality of groups of potential abnormal data points is subject to the predetermined distribution based on the Q-Q graph.

7. The method of claim 1, wherein determining the correlations among the plurality of groups of potential abnormal data points comprises:

determining, by the one or more processors, the correlations among the plurality of groups of potential abnormal data points by performing an Analysis of Variance on the plurality of groups of potential abnormal data points.

8. The method of claim 1, further comprising:

determining, by the one or more processors, a group of potential normal data points based on one of the plurality of groups comprising the potential normal data points;

determining, by the one or more processors, a normal data range, based on an average value of the group of potential normal data points and a standard deviation of the group of potential normal data points; and in response to a data point in the group of potential normal data points falling outside the normal data range, identifying, by the one or more processors, the data point as an abnormal data point.

9. A computer system comprising:

one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

classifying a plurality of data points collected at different time points into a plurality of groups, wherein each of the plurality of groups comprises either potential abnormal data points or potential normal data points, wherein each data point of the plurality of data points comprises a value of a performance indicator of a database collected at corresponding time point of a set of time points, wherein the value of a performance indicator is a count of latches observed;

determining a plurality of groups of potential normal data points from the plurality of groups, wherein each group of the plurality of groups of potential normal data points are collected within a corresponding range of time points, wherein each data point of the plurality of groups of potential normal data points comprises a value of a performance indicator below a first threshold of 30,000 latches within the corresponding range time points, wherein the corresponding range of time points comprises a normal usage time period of database usage;

determining an average value and a standard deviation of the potential normal data points of the plurality of groups of potential normal data points from the plurality of groups;

determining a plurality of groups of potential abnormal data points from the plurality of groups, wherein each group of the plurality of groups of potential abnormal data points are collected within a corresponding range of time points, wherein each data point of the plurality of groups of potential abnormal data points comprises a value of the performance indicator above the first threshold within the corresponding range of time points, wherein the corresponding range of time points comprises a peak usage time period of database usage;

determining correlations between a first group of the plurality of groups of potential abnormal data points with other groups of potential abnormal data points based on the average value and the standard deviation of the potential normal data points of the plurality of groups of potential normal data points from the plurality of groups, wherein a first subset of data points are uncorrelated to greater than 50 percent of the plurality of groups of potential data points;

in response to the first group of the plurality of groups of potential abnormal data points being uncorrelated to a majority of the other groups of potential abnormal data points based on the correlations, identifying the first subset of data points in the first group as abnormal data points; and in response to identifying the first subset of data points in the first group as abnormal datapoints, identifying which statistics are abnormal and are a root cause of a failure of the database.

10. The computer system of claim 9, wherein classifying the plurality of data points into the plurality of groups comprises:

classifying the plurality of data points into the plurality of groups by using a k-means clustering algorithm, wherein either potential abnormal data points or potential normal data points comprised in each of the plurality of groups are collected within a respective time window.

11. The computer system of claim 9, wherein determining the plurality of groups of potential abnormal data points from the plurality of groups comprises:

determining each of the plurality of groups of potential abnormal data points based on a corresponding one of the plurality of groups comprising the potential abnormal data points;

determining whether each of the plurality of groups of potential abnormal data points is subject to a predetermined distribution; and in response to a second group of the plurality of groups of potential abnormal data points being not subject to the predetermined distribution, removing the second group from the plurality of groups of potential abnormal data points.

12. The computer system of claim 11, wherein the predetermined distribution is a Gaussian distribution.

13. The computer system of claim 11; wherein determining whether each of the plurality of groups of potential abnormal data points is subject to the predetermined distribution comprises:

performing a Kolmogorov-Smirnov test on each of the plurality of groups of potential abnormal data points.

14. The computer system of claim 11, wherein determining whether each of the plurality of groups of potential abnormal data points is subject to the predetermined distribution comprises:

generating a Q-Q graph based on each of the plurality of groups of potential abnormal data points; and determining whether each of the plurality of groups of potential abnormal data points is subject to the predetermined distribution based on the Q-Q graph.

15. The computer system of claim 9, wherein determining the correlations among the plurality of groups of potential abnormal data points comprises:

determining the correlations among the plurality of groups of potential abnormal data points by performing an Analysis of Variance on the plurality of groups of potential abnormal data points.

16. The computer system of claim 9, further comprising:

determining a group of potential normal data points based on one of the plurality of groups comprising the potential normal data points;

determining, based on an average value of the group of potential normal data points and a standard deviation of the group of potential normal data points, a normal data range; and in response to a data point in the group of potential normal data points falling outside the normal data range, identifying the data point as an abnormal data point.

17. A computer program product, comprising:

one or more computer-readable storage medium and program instructions stored on at least one of the one or more computer-readable storage medium, the program instructions executable by a processor to cause the processor to perform a method comprising:

classifying a plurality of data points collected at different time points into a plurality of groups, wherein each of the plurality of groups comprises either potential abnormal data points or potential normal data points, wherein each data point of the plurality of data points comprises a value of a performance indicator of a database collected at corresponding time point of a set of time points, wherein the value of a performance indicator is a count of latches observed;

determining a plurality of groups of potential normal data points from the plurality of groups, wherein each group of the plurality of groups of potential normal data points are collected within a corresponding range of time points, wherein each data point of the plurality of groups of potential normal data points comprises a value of a performance indicator below a first threshold of 30,000 latches within the corresponding range time points, wherein the corresponding range of time points comprises a normal usage time period of database usage;

determining an average value and a standard deviation of the potential normal data points of the plurality of groups of potential normal data points from the plurality of groups;

determining a plurality of groups of potential abnormal data points from the plurality of groups, wherein each group of the plurality of groups of potential abnormal data points are collected within a corresponding range of time points, wherein each data point of the plurality of groups of potential abnormal data points comprises a value of the performance indicator above the first threshold within the corresponding range of time points, wherein the corresponding range of time points comprises a peak usage time period of database usage;

determining correlations between a first group of the plurality of groups of potential abnormal data points with other groups of potential abnormal data points based on the average value and the standard deviation of the potential normal data points of the plurality of groups of potential normal data points from the plurality of groups, wherein a first subset of data points are uncorrelated to greater than 50 percent of the plurality of groups of potential data points;

in response to the first group of the plurality of groups of potential abnormal data points being uncorrelated to a majority of the other groups of potential abnormal data points based on the correlations, identifying the first subset of data points in the first group as abnormal data points; and in response to identifying the first subset of data points in the first group as abnormal datapoints, identifying which statistics are abnormal and are a root cause of a failure of the database.

18. The computer program product of claim 17, wherein classifying the plurality of data points into the plurality of groups comprises:

classifying the plurality of data points into the plurality of groups by using a k-means clustering algorithm, wherein either potential abnormal data points or potential normal data points comprised in each of the plurality of groups are collected within a respective time window.

19. The computer program product of claim 17, wherein determining the plurality of groups of potential abnormal data points from the plurality of groups comprises:

determining each of the plurality of groups of potential abnormal data points based on a corresponding one of the plurality of groups comprising the potential abnormal data points;

determining whether each of the plurality of groups of potential abnormal data points is subject to a predetermined distribution; and in response to a second group of the plurality of groups of potential abnormal data points being not subject to the predetermined distribution, removing the second group from the plurality of groups of potential abnormal data points.

20. The computer program product of claim 19, wherein the predetermined distribution is a Gaussian distribution.

* * * * *